(12) United States Patent
McGlinchy et al.

(10) Patent No.: US 10,920,480 B2
(45) Date of Patent: Feb. 16, 2021

(54) THERMALLY EFFICIENT WINDOW FRAME

(71) Applicant: GED INTEGRATED SOLUTIONS, INC., Twinsburg, OH (US)

(72) Inventors: Timothy B. McGlinchy, Twinsburg, OH (US); William A. Briese, Hinckley, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 131 days.

(21) Appl. No.: 15/881,114

(22) Filed: Jan. 26, 2018

(65) Prior Publication Data
US 2019/0071919 A1    Mar. 7, 2019

Related U.S. Application Data

(60) Provisional application No. 62/554,201, filed on Sep. 5, 2017.

(51) Int. Cl.
*E06B 3/663*    (2006.01)
*E06B 3/673*    (2006.01)
(Continued)

(52) U.S. Cl.
CPC .......... *E06B 3/66323* (2013.01); *B29C 48/12* (2019.02); *E06B 3/67313* (2013.01);
(Continued)

(58) Field of Classification Search
CPC ............. E06B 3/66323; E06B 3/67313; E06B 2003/66385
See application file for complete search history.

(56) References Cited

U.S. PATENT DOCUMENTS 5,125,195 A    6/1992 Brede
5,361,476 A    11/1994 Leopold
(Continued)

FOREIGN PATENT DOCUMENTS

WO    WO 2007/014655    2/2007

OTHER PUBLICATIONS

International Search Report and Written Opinion of the International Searching Authority dated Nov. 9, 2018 for PCT International Application No. PCT/US2018/48482, filed Aug. 29, 2018. PCT International Application No. PCT/US2018/48482 corresponds to and claims priority from the present application. (12 pages).

(Continued)

*Primary Examiner* — Donald J Loney
(74) *Attorney, Agent, or Firm* — Tarolli, Sundheim, Covell & Tummino LLP; John A. Yirga, Esq.

(57) ABSTRACT

A spacer frame for use in fabricating a window and a method of fabrication thereof is disclosed. The spacer frame for separating first and second glass lites from each other in window. The spacer frame includes a frame forming a multi-sided form comprising a first outwardly facing surface for supporting a first glass lite that is contiguous with a first intermediate wall portion and a second outwardly facing surface for supporting a second glass lite that is contiguous with a second intermediate wall portion. The first and second intermediate wall portions comprise a first material and are linked to each other and spaced from each other by a thermal interruption strip. The first and second intermediate wall portions and the thermal interruption strip comprise an intermediate wall that bridges the first and second outwardly facing surfaces. The spacer frame further includes a film overlaying the intermediate wall portion.

20 Claims, 14 Drawing Sheets

(51) Int. Cl.
*B29C 48/12* (2019.01)
*B29L 31/00* (2006.01)
*B29C 48/00* (2019.01)
*B29C 48/155* (2019.01)

(52) U.S. Cl.
CPC ........ *B29C 48/0021* (2019.02); *B29C 48/155* (2019.02); *B29L 2031/7782* (2013.01); *E06B 2003/66385* (2013.01); *E06B 2003/66395* (2013.01)

(56) References Cited

U.S. PATENT DOCUMENTS

| | | | |
|---|---|---|---|
| 6,910,311 B2* | 6/2005 | Lindberg | E04O 3/07 52/588.1 |
| 8,114,232 B2 | 2/2012 | Lisec | |
| 8,720,026 B2 | 5/2014 | McGlinchy | |
| 8,756,879 B2 | 6/2014 | Cempulik et al. | |
| 9,260,906 B2 | 2/2016 | Schreiber | |
| 9,428,953 B2 | 8/2016 | Briese et al. | |
| 2001/0032436 A1 | 10/2001 | Riegalman | |
| 2006/0075719 A1 | 4/2006 | James et al. | |
| 2008/0060290 A1 | 3/2008 | McGlinchy et al. | |
| 2008/0134596 A1 | 6/2008 | Brunnhofer et al. | |
| 2008/0315024 A1 | 12/2008 | Gallagher | |
| 2012/0137608 A1 | 6/2012 | Plant et al. | |
| 2013/0316184 A1 | 11/2013 | Siodla et al. | |

OTHER PUBLICATIONS

U.S. Appl. No. 15/720,892, filed Sep. 29, 2017 (77 pgs.).
Written Opinion of the International Searching Authority for PCT/US2018/048482 dated Oct. 11, 2018 (11 pages).

* cited by examiner

THERMALLY EFFICIENT WINDOW FRAME

CROSS REFERENCES TO RELATED APPLICATIONS

The following application claims priority under 35 U.S.C. 119(e) to co-pending U.S. Provisional Patent Application Ser. No. 62/554,201 filed Sep. 5, 2017 entitled THERMALLY EFFICIENT WINDOW FRAME. The above-identified provisional application is incorporated herein by reference in its entirety for all purposes.

FIELD OF THE INVENTION

The present disclosure relates to insulating glass units and more particularly to a thermally efficient window frame that comprises a spacer frame with a thermal bather to reduce heat transfer across the spacer frame and through the insulating glass units.

BACKGROUND OF THE INVENTION

Insulating glass units (IGUs) are used in windows to reduce heat loss from building interiors during cold weather and to prevent the entrance of heat during warm weather. IGUs are typically formed by a spacer assembly sandwiched between glass lites. A spacer assembly usually comprises a frame structure extending peripherally about the unit, a sealant material adhered both to the glass lites and the frame structure, and a desiccant for absorbing atmospheric moisture within the unit. The margins of the glass lites are flush with or extend slightly outwardly from the spacer assembly. The sealant extends continuously about the frame structure periphery and its opposite sides so that the space within the IGUs is hermetic.

One successful IGU construction has employed tubular, roll formed aluminum or steel frame elements connected at their ends to form a square or rectangular spacer frame. The frame sides and corners were covered with sealant (e.g., a hot melt material) for securing the frame to the glass lites. The sealant provided a barrier between atmospheric air and the IGU interior, which blocked entry of atmospheric water vapor. Particulate desiccant deposited inside the tubular frame elements communicated with air trapped in the IGU interior to remove the entrapped airborne water vapor, and thus, preclude its condensation within the unit. Thus, after the water vapor entrapped in the IGU was removed, internal condensation only occurred when the unit failed.

Alternatively, individual roll formed spacer frame tubes were cut to length and "corner keys" were inserted between adjacent frame element ends to form the corners. In some constructions, the corner keys were foldable so that the sealant could be extruded onto the frame sides as the frame moved linearly past a sealant extrusion station. The frame was then folded to a rectangular configuration with the sealant in place on the opposite sides. The formed spacer was then placed between glass lites and the IGU assembly completed.

A typical insulating glass unit (IGU) 10 is illustrated in FIG. 1. The IGU 10 includes a spacer assembly 12 sandwiched between glass sheets, or lites, 14. The assembly 12 comprises a frame structure 16 and sealant material for hermetically joining the spacer assembly 12 to the lites 14 to form a closed space 20 within the IGU 10. The prior art IGU 10 illustrated in FIG. 1 is in condition for final assembly into a window or door frame.

The assembly 12 maintains the lites 14 spaced apart from each other to produce the hermetic insulating "insulating air space" 20 between them. The typical frame 16 comprises a plurality of spacer frame segments, or members, 30a-d connected to form a planar, polygonal frame shape, element juncture forming frame corner structures 32a-d, and connecting structure 34 for joining opposite frame element ends to complete the closed frame shape. Traditionally a frame member 30 is has a channel shaped cross section defining a peripheral wall 40 and first and second lateral walls 42, 44 (see FIGS. 2-3). The peripheral wall 40 extends continuously about the IGU 10 except where the connecting structure 34 joins the frame member ends.

The frame 16 extends about the unit periphery, such that, in an installed window, a lite 14 exposed to the external temperature is thermally connected to a lite 14 that is exposed to an internal temperature via the peripheral wall 40. This thermal connection causes a thermal energy flow between the internal and external regions bound by the window, causing the internal desired temperature to be altered by the external not-desired temperature.

U.S. Pat. No. 5,361,476 to Leopold discloses a method and apparatus for making IGUs wherein a thin flat strip of sheet material is continuously formed into a channel shaped spacer frame having corner structures and end structures, the spacer thus formed is cut off, sealant and desiccant are applied and the assemblage is bent to form a spacer assembly. U.S. Pat. No. 5,361,476 to Leopold is incorporated herein by reference in its entirety for all purposes.

U.S. Pat. Pub. No. 2001/0032436 to Riegelman entitled "Insulated Channel Seal for Glass Panes" and U.S. Pat. Pub. No. 2008/0060290 to McGlinchy concerns a structure having a channel for a frame which separates window panes to form an insulated window and has a plurality of openings through a wall of the channel that faces outward along the periphery of the frame and glass sandwich. In Riegelman, the openings are designed to prevent significant passage of sealant from the outside of the channel to the inside of the channel through the openings. This is done by the cross sectional area of each opening being so small that it resists viscous flow of the sealant through the opening, or by a cover over the opening. U.S. Pat. Pub. No. 2001/0032436 to Riegelman is incorporated herein incorporated by reference in its entirety for all purposes. U.S. Pat. Pub. No. 2008/0060290 to McGlinchy is herein incorporated by reference in its entirety and for all purposes.

Companies by the names of Edgetech and Nynex produce window spacer frames formed entirely of PVC having thermally efficient insulating characteristics. U.S. Pat. Pub. No. 2008/0134596 to Brunnhofer et al. entitled "Spacer Profile for a Spacer Frame for an Insulating Window Unit and Insulating Window Unit" concerns a mountable spacer profile for forming an intervening space. U.S. Pat. Pub. No. 2008/0134596 to Brunnhofer et al. is herein incorporated by reference in its entirety and for all purposes.

SUMMARY

One aspect of the present disclosure includes a spacer for separating first and second glass lites from each other in an insulating glass unit (IGU) for use in fabricating a window or door. The spacer frame comprising an elongated frame forming a multi-sided unit comprising a first outwardly facing surface for supporting the first glass lite. The first outwardly facing surface is contiguous with a first intermediate wall portion. The spacer frame further comprises a second outwardly facing surface for supporting the second glass lite. The second outwardly facing surface is contiguous with a second intermediate wall portion, wherein the first and second intermediate wall portions comprise a first material and are linked to each other and spaced from each other by a thermal interruption strip. The first and second intermediate wall portions and the thermal interruption strip comprise an intermediate wall that bridges the first and second outwardly facing surfaces. Additionally, the spacer frame comprises a film for preventing fluid leakage, overlaying the intermediate wall portion.

Another aspect of the present disclosure comprises thermal stock for use in forming a spacer frame for use in an insulating glass unit (IGU). The thermal stock comprising first and second frame stock portions comprising a first thermal conductivity value, and a thermal interruption strip coupling the first frame stock portion to the second frame stock portion. The thermal interruption strip spacing the first frame stock portion a gap distance from the second frame stock portion. The thermal interruption strip comprising a second thermal conductivity value, the second thermal conductivity being less than the first thermal conductivity value. Wherein an intermediate wall portion comprising the thermal interruption strip is covered by a film material for preventing fluid leakage.

Yet another aspect of the present disclosure comprises a method of forming thermal stock for use in insulating glass units. The method comprises forming a first and second frame stock portion, laterally linking the first and second frame stock portions via a thermal interruption strip. The thermal interruption strip spacing the first frame stock portion from the second frame stock portion, and comprising a lower thermal conductivity material than the material first and second frame stock portions. The method further comprising overlaying the thermal interruption strip and at least a portion of the first and second frame stock portions with a film.

Yet another aspect of the present disclosure comprises an insulating glass unit comprising first and second glass lites spaced apart from each other having inner facing surfaces that bound an interior region, a multi-sided channel shaped composite spacer frame for arranging said first and second glass lites in a spaced apart, generally parallel relation to each other. The spacer frame comprising an elongated thermal interruption strip forming a middle portion of said composite spacer frame that extends around a periphery of the interior region bound by the first and second glass lites, a first elongated metal side wall member having a first outwardly facing side wall surface for orienting the first glass lite and a first inwardly facing side wall surface that bounds the interior region wherein the first elongated metal side wall member includes a first embedded portion securing the first metal side wall member to the thermal interruption strip, and a second elongated metal side wall member having a second outwardly facing side wall surface for orienting the second glass lite and a second inwardly facing side wall surface that bounds the interior region wherein the second elongated metal side wall member includes a second embedded portion securing the second metal side wall member to the thermal interruption strip. The spacer frame further comprising an adhesive material interposed between the outwardly facing side wall surfaces of said first and second metal side wall members and the first and second glass lites for arranging the first and second glass lites in spaced relation to each other and a vapor bather overlying at least a portion of the thermal interruption strip to impede contaminants from reaching the interior region bounded by the first and second glass lites.

While another aspect of the present disclosure comprises thermal stock for use in forming a spacer frame for use in an insulating glass unit (IGU), the thermal stock includes first and second metallic ribbons that are substantially planar comprising first and second lateral ends, the first and second metallic ribbons having a first thermal conductivity; a polymeric thermal interruption strip formed over and between the second lateral ends of the first and second metallic ribbons, the polymeric thermal interruption strip spacing the first and second metallic ribbons by forming a gap between the second lateral ends, the gap being fixedly within the polymeric thermal interruption strip, the polymeric thermal interruption ship comprising a second thermal conductivity, the second thermal conductivity is less than the first thermal conductivity; the polymeric thermal interruption strip further comprising spaced first and second mirrored converging lateral ends forming a sandwich connection with and over the second lateral ends of the first and second metallic ribbons, the sandwich connection extending toward the first lateral ends to cover a portion of the first and second metallic ribbons beyond the second lateral connection ends, the polymeric thermal interruption strip further comprising a planar body that connects the first and second spaced mirrored converging lateral ends, the planar body covers a portion of the metallic ribbons and the entire gap between the second lateral ends of the first and second metallic ribbons; and a film material covering a portion of first and second longitudinal sides of the first and second metallic ribbons and an entire first and second longitudinal sides of the polymeric thermal interruption strip.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which:

FIG. 6B is cross sectional view of the spacer frame assembly of FIG. 6A taken along lines 6B-6B;

Figure 1:
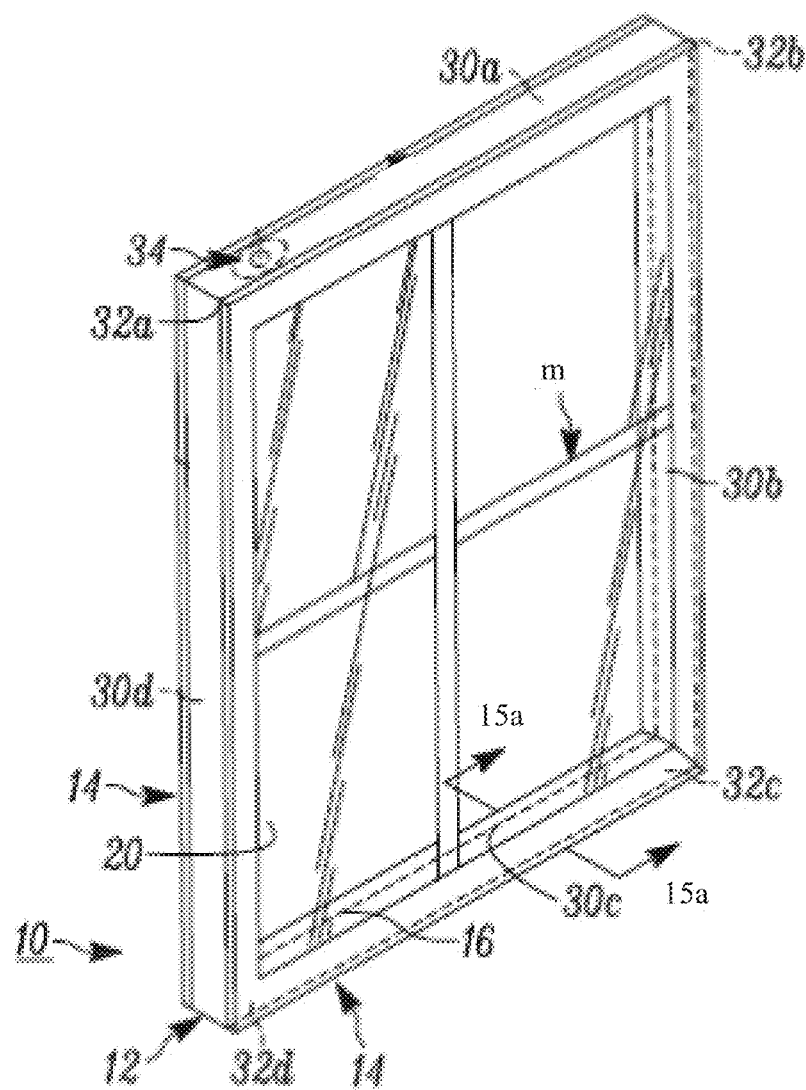
FIG. 1 is perspective view of a typical insulating glass unit as known in the prior art.
Figures 2, 3:
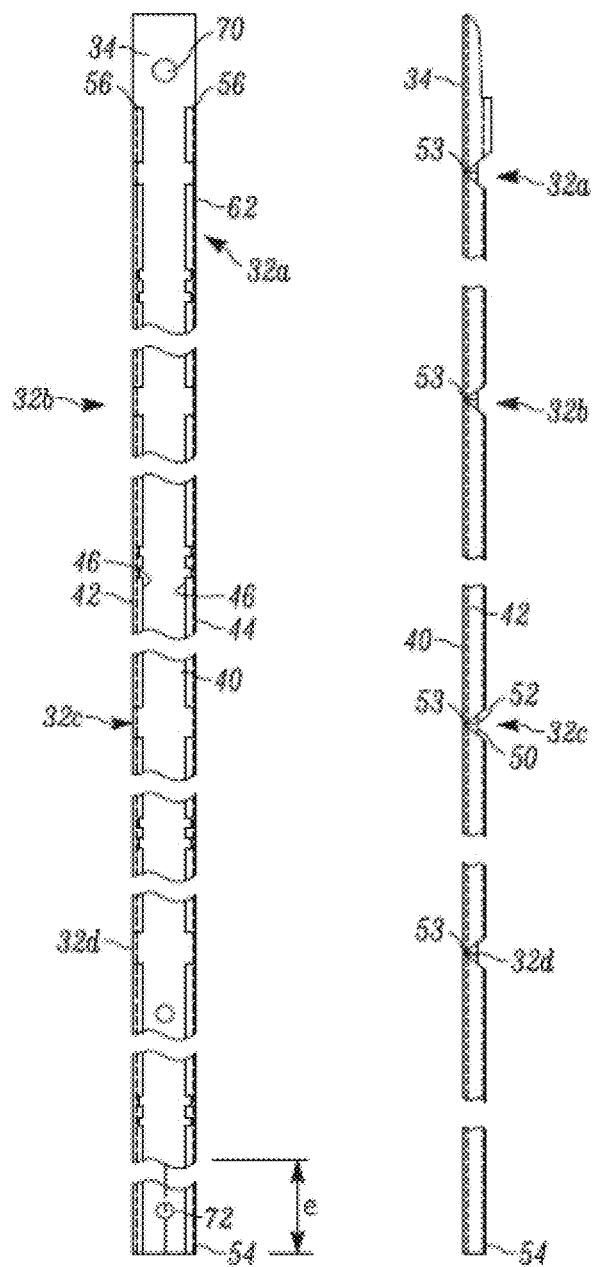
FIG. 2 is a top view of a typical spacer frame that forms part of the typical insulating glass unit of FIG. 1 as known in the prior art.
FIG. 3 is a left side elevation view of FIG. 2 as known in the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure relates to insulating glass units and more particularly to a thermally efficient window frame that comprises a spacer frame with a thermal barrier to reduce heat transfer across the spacer frame and through the insulating glass units.

Figure 4:
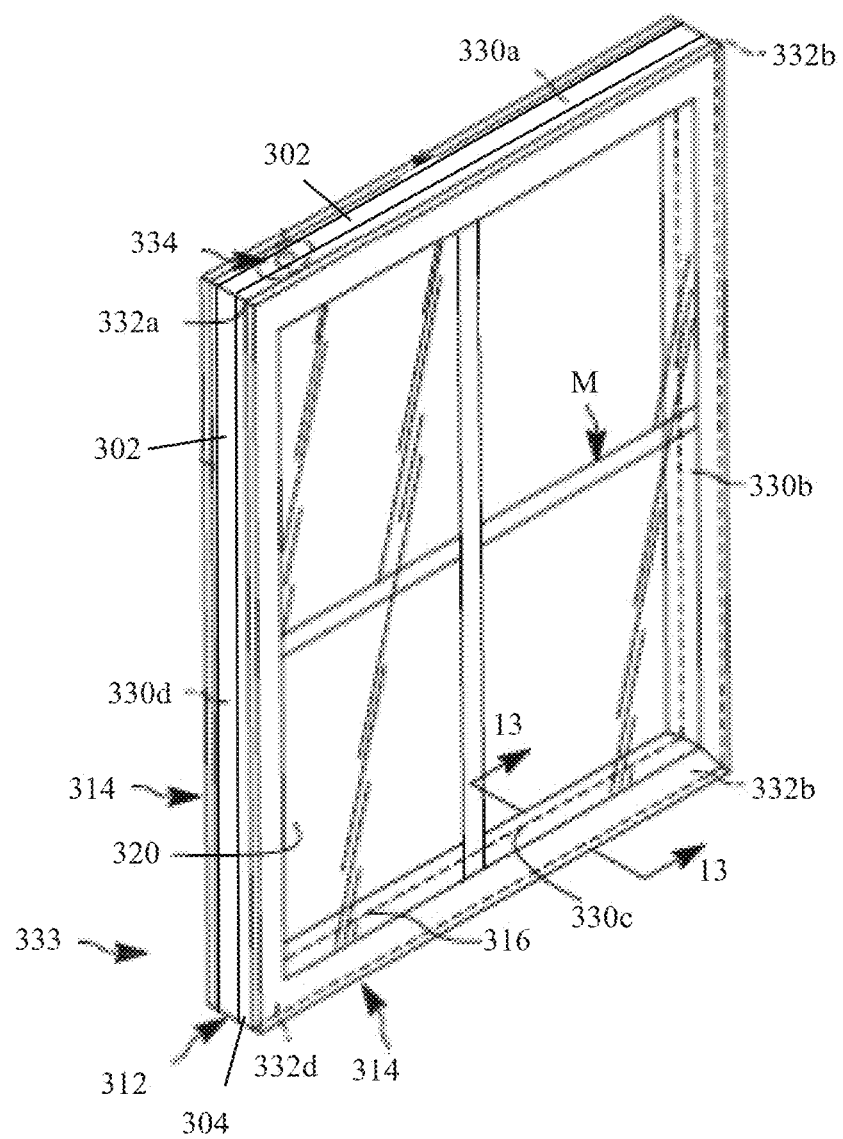
FIG. 4 is perspective view of an insulating glass unit (IGI) constructed in accordance with one example embodiment of the present disclosure.

A double pane insulating glass unit (IGU) 333 is illustrated in FIG. 4. The IGU 333 includes a spacer assembly 312 sandwiched between glass sheets, or lites 314. The assembly 312 comprises a frame 316 and sealant material (omitted for clarity) for hermetically joining the spacer assembly 312 to the lites 314 to form a closed space 320 within the IGU 333. The IGU 333 is illustrated in FIG. 4 as in condition for final assembly into a window or door frame, not illustrated, for ultimate installation in a building. The IGU 333 as illustrated in FIG. 4 includes muntin bars "m" that provide the appearance of individual window panes. It would be appreciated by one having ordinary skill in the art that multi-pane IGUs were contemplated, and the frame structures used therein would be substantially the same as the frame 316 described with regard to the IGU 333. Further discussion of multi-pane IGUs and their assembly process is found in U.S. Pat. Nos. 9,416,583 and 9,534,439, which are assigned to the assignee of the present disclosure. Both U.S. Pat. Nos. 9,416,583 and 9,534,439 are incorporated herein in their entireties for all purposes.

The assembly 312 maintains the lites 314 spaced apart from each other to produce the hermetic insulating "insulating air space" 320 between them. The frame 316 and the sealant body 318 (see FIG. 13) co-act to provide a structure which maintains the lites 314 properly assembled with the space 320 sealed front atmospheric moisture over long time periods during which, the IGU 333 is subjected to frequent significant thermal stresses. A desiccant 319 (see FIG. 13) removes water vapor from air, or other volatiles, entrapped in the space 320 during construction of the IGU 333.

The sealant 318 both structurally adheres the lites 314 to the spacer assembly 312 and hermetically closes the space 320 against infiltration of airborne water vapor from the atmosphere surrounding the IGU 333. One suitable sealant is formed from a "hot melt" material, which is attached to the frame 316 sides and outer periphery to form a U-shaped cross section.

The frame 316 extends about the unit periphery to provide a structurally strong, stable spacer 312 for maintaining the lites 314 aligned and spaced while minimizing heat conduction between the lites via the frame. The preferred frame 316 comprises a plurality of spacer frame segments, or members, 330a-d connected to form a planar, polygonal frame shape, element juncture forming frame corner structures 332a-d, and connecting structure 334 (see FIG. 6C) for joining opposite frame element ends 362, 364 to complete the closed frame shape.

Figure 5:
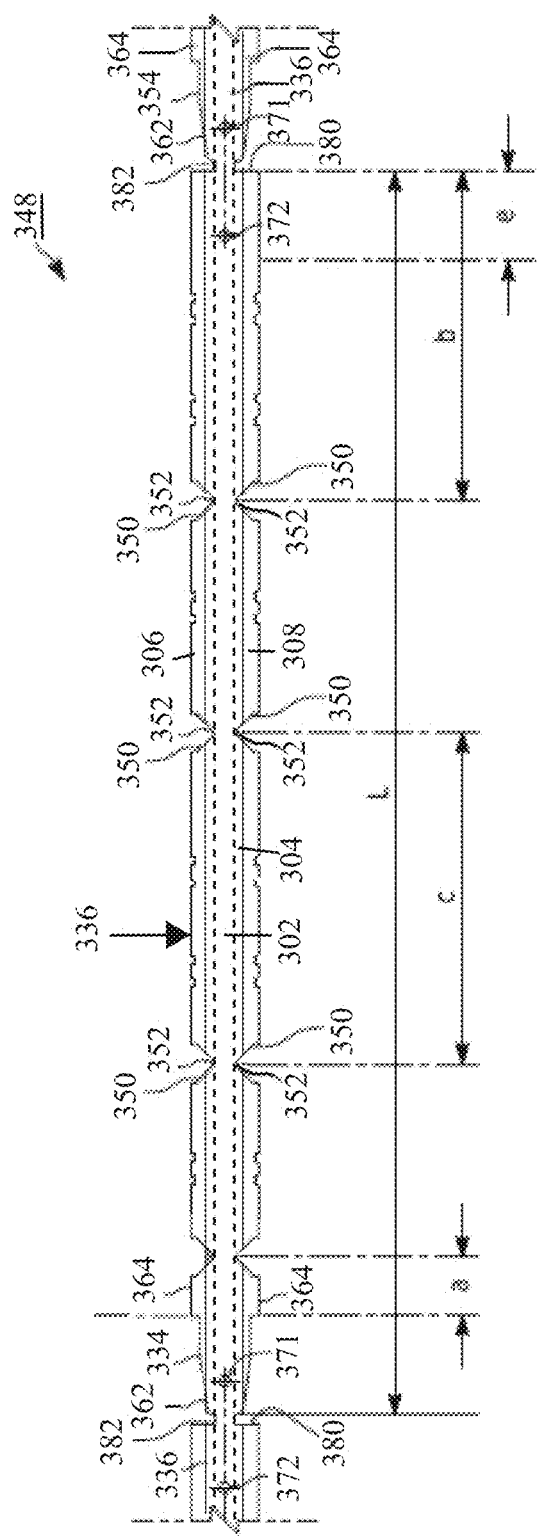
FIG. 5 is a plan view of flat thermal stock after a punching operation that will be formed into one or more thermal spacer frame assemblies before the flat stock is roll formed or has sealant applied.
Figure 5A:
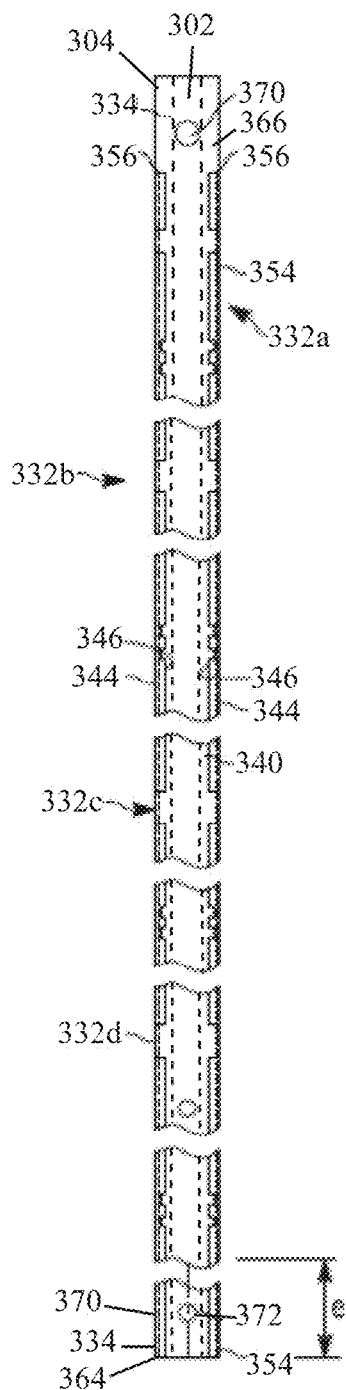
FIG. 5A is a top view of the thermal spacer frame assembly located in the IGU illustrated in FIG. 4 after a roll forming operation is performed on the flat thermal stock illustrated in FIG. 5.
Figure 9:
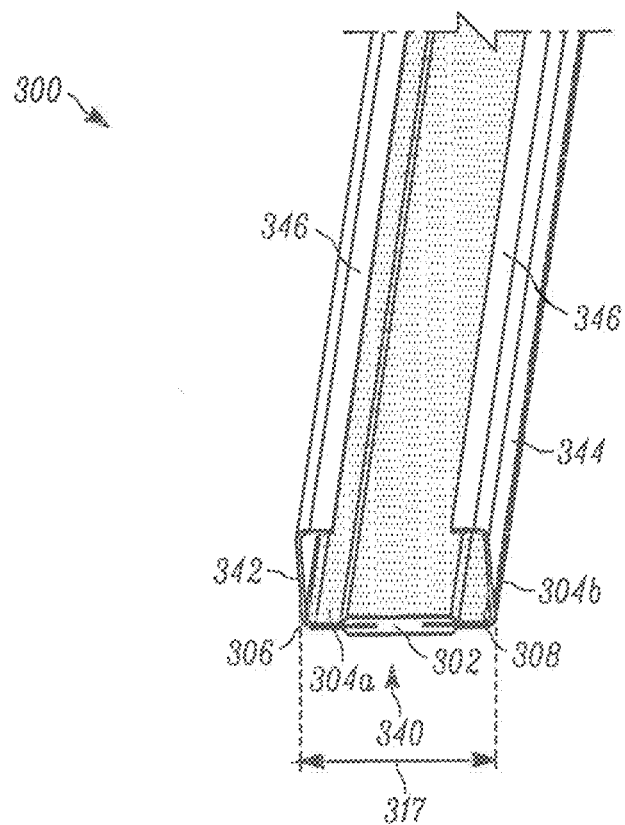
FIG. 9 is a top perspective view of a thermal spacer frame assembly comprising roll formed thermal sheet stock in accordance with one example embodiment of the present disclosure.
Figure 13:
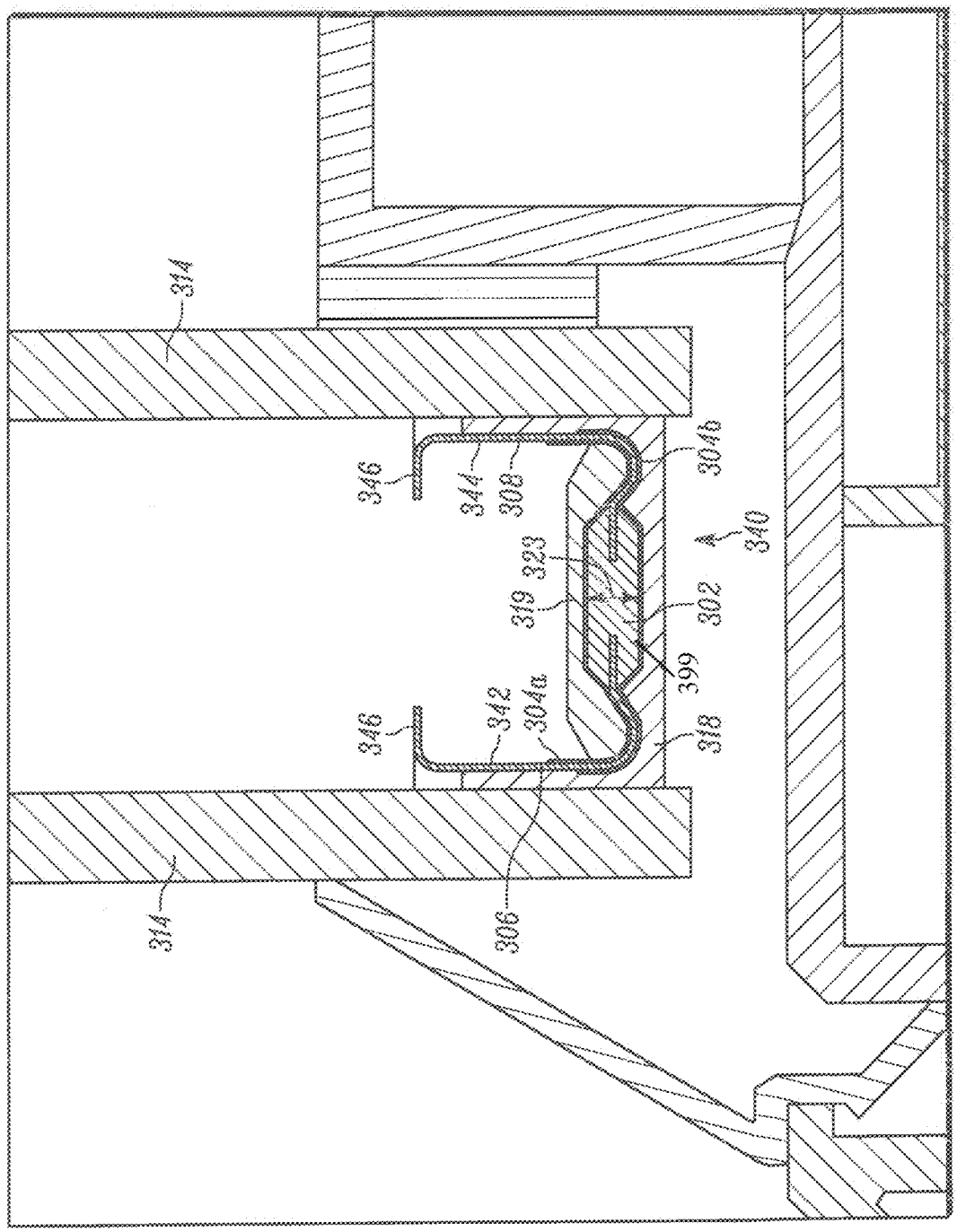
FIG. 13 is a cross-section taken along line 13-13 of FIG. 4.

The frame member 330 is elongated and has a channel-shaped cross section, defining a peripheral wall 340 and first and second lateral walls 342, 344 (see FIGS. 5A, 9, and 13). The peripheral wall 340 comprises frame stock 306, 308 spaced from each other and linked to each other by a thermal interruption strip 302 (see FIGS. 5A, 9, and 13, and 14). A film 304 overlays at least a portion of the stock 306, 308, and the thermal interruption strip 302 (see, for example, FIG. 9). The peripheral wall 340 extends continuously about the IGU 333 except where the connecting structure 334 joins the frame member ends 362, 364. The lateral walls 342, 344 are integral with respective opposite peripheral wall edges. The lateral walls 342, 344 extend inwardly from the peripheral wall 340 in a direction parallel to the planes of the lites 314 and the frame 316. The illustrated frame 316 has stiffening flanges 346 formed along the inwardly projecting lateral wall edges. The lateral walls 342, 344 add rigidity to the frame member 330 so it resists flexure and bending in a direction transverse to its longitudinal extent. The flanges 346 stiffen the walls 342, 344 so they resist bending and flexure transverse to their longitudinal extents.

Illustrated in FIG. 5 is the continuous metal ribbon or flat stock 348 that is roll formed into the channel shaped cross section defining the peripheral wall 340 and first and second lateral walls 342, 344 (see FIGS. 5A, 9, and 13). The flat stock 348 is passed through a stamping station and punched by a number of dies to form notches 350 and weakening zones 352 for corner folds 332, a connecting structure 334, a nose 362, gas fill apertures 371, 372, and end cut 380. The thermal interruption strip 302 is illustrated in dashed lines for clarity as the film 304 overlays said thermal interruption strip. A punch strip 336 of flat thermal stock 310 forms a thermal spacer frame assembly 312 as illustrated in repeating sections by dimension "L" from the continuous strip 348. The punch strip 336 is eventually sheared to make a spacer frame assembly 312 at end 380 and the nose 362, leaving scrap piece 382. Alternatively, the punching or shearing operation is a single hit operation in which the width of the shear equals that of scrap piece 382, leaving no scrap or need for a double hit operation. Further discussion relating to the shearing or punching operation is discussed in U.S. Pat. No. 8,720,026, which is incorporated herein by reference in its entirety. The gas fill apertures 371, 372 comprise holes punched into the flat thermal stock 310.

The frame 316 is initially formed as a continuous straight channel constructed from thermal stock 310, wherein the thermal stock comprises two independent thin ribbons of stock material 306, 308 (e.g., 304 stainless steel having a thickness of 0.006-0.010 inches) linked via the thermal interruption strip 302, and at least partially overlaid with the film 304. It should be appreciated that the metal stock 306 could also be 1020 steel, mild steel, hardened steel, aluminum, CrMo steel, nickel, carbon steel, and the like.

In one example embodiment, the frame stock 306, 308 comprises other materials, such as galvanized and/or tin plated steel, aluminum and/or plastic. The thermal interruption strip 302 in one example embodiment comprises a non-thermally conductive material such as a polymer (e.g., aliphatic or semi-aromatic polyamides (Nylon), polyethylene, polyester, epoxy, etc.), a plastic (e.g., polyethylene terephthalate, high-density polyethylene, polyvinyl chloride, etc.) rubber, hardening agents (e.g., calcuim carboniate, talc, barium sulphate, glass fibers, etc.), bonding agents (e.g., polyvinyl acetate) or a combination thereof. The thermal interruption strip 302 comprises a durometer between 70-90 Shore D which has a sufficient rigidity at temperatures up to below 100° C., to maintain the shape of the channel, and the walls 342, 344, yet provide the flexibility to bend when assembled (see FIG. 6C) at the corners C1-C4 without separation at corners C1-C4. The film 304 comprises an air tight film such as a metalized polyester film, to prevent loss of thermally efficient insulating fluids (e.g., He, Ne, Ar, Kr, Xe, or the like) from the space 320, the flexibility of the film 304 also provides strength to the spacer frame and thermal interruption strip 302 to prevent fracturing during the bending at the corners C1-C4. In one example embodiment, the film 304 comprises a low moisture vapor transition rate (MVTR) barrier film. Examples of products that can be used as film 304 include Mylar resin (e.g., Polyethylene Terephthalate (PET)), 3M's P Model #850 Polyester film, and the like.

As described more fully below, the corner structures 332 are made to facilitate bending the frame channel to the final, polygonal frame configuration in the IGU 333 while assuring an effective vapor seal at the frame corners and properly aligning apertures 371, 372. The gas fill apertures 371, 372 comprise holes punched into the thermal interruption strip 302. The gas fill apertures 371, 372 are used to either inject the space 320 in the IGU 333 with a liquid and/or solid, or to evacuate the space. In one example embodiment, the corner structures 332 are manually or automatically bent when the frame 316 is maintained at an elevated bending temperature. The bending temperature is determined based upon a melting temperature and/or a heat distortion temperature of the thermal interruption strip 302. In this embodiment, the apertures 371, 372 are formed while the thermal interruption strip 302 is at the bending temperature, to facilitate aperture formation. In another embodiment, the apertures 371, 372 are formed through the thermal interruption strip 302 utilizing a punch and/or screw before or after roll forming.

Figure 6A:
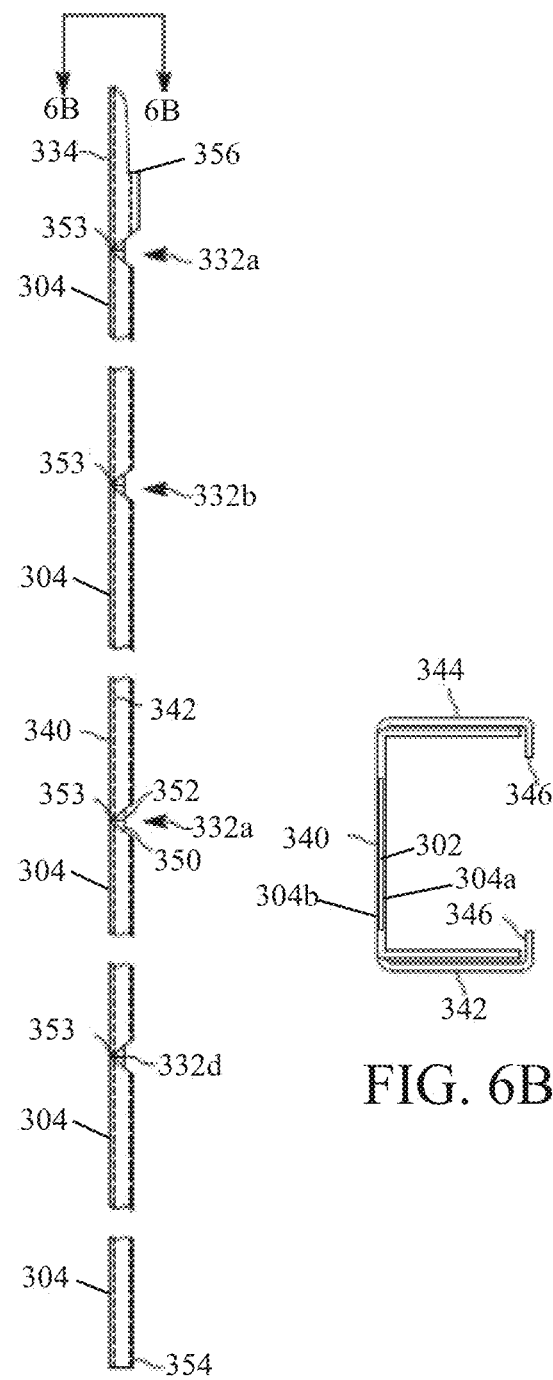
FIG. 6A is a left side elevation view of FIG. 5A.

In yet another embodiment, the apertures 371, 372 are formed through the thermal interruption strip 302 via a hot or thermal punch, cold punch, and/or a hole drilling mechanism. Sealant 318 is applied and adhered to the channel before the corners 332 are bent. As shown in the illustrated embodiment of FIGS. 5, 5A, and 6A, the corner structures 332 initially comprise notches 350 and weakened zones 352 formed in the walls 342, 344 at frame corner locations. The notches 350 extend into the walls 342, 344 from the respective lateral wall edges. The lateral walls 342, 344 extend continuously along the frame 316 from one end to the other. The walls 342, 344 are weakened at the corner locations 332 because the notches reduce the amount of lateral wall material, a portion of the film 304, and eliminate the stiffening flanges 346 and because the walls are punched and stamped to weaken them at the corners. At the same time the notches 350 are formed, the weakened zones 352 are formed. These weakened zones are cut into the strip 310, but not all the way through. When this strip 310 is rollformed, the weakened zones 352 can spring back and have an outward tendency.

The connecting structure 334 secures the opposite frame ends 362, 364 together when the frame 316 has been bent to its final configuration. The illustrated example embodiment of FIG. 6C, the connecting structure 334 comprises a connecting tongue structure 366 continuous with and projecting from the frame structure end 362 and a tongue receiving structure 370 at the other frame end 364. The illustrated example embodiment tongue and tongue receiving structures 366, 370 are constructed and sized relative to each other to form a telescopic joint 358. When assembled, the telescopic joint 358 maintains the frame in its final polygonal configuration prior to assembly of the unit 333.

Figure 6C:
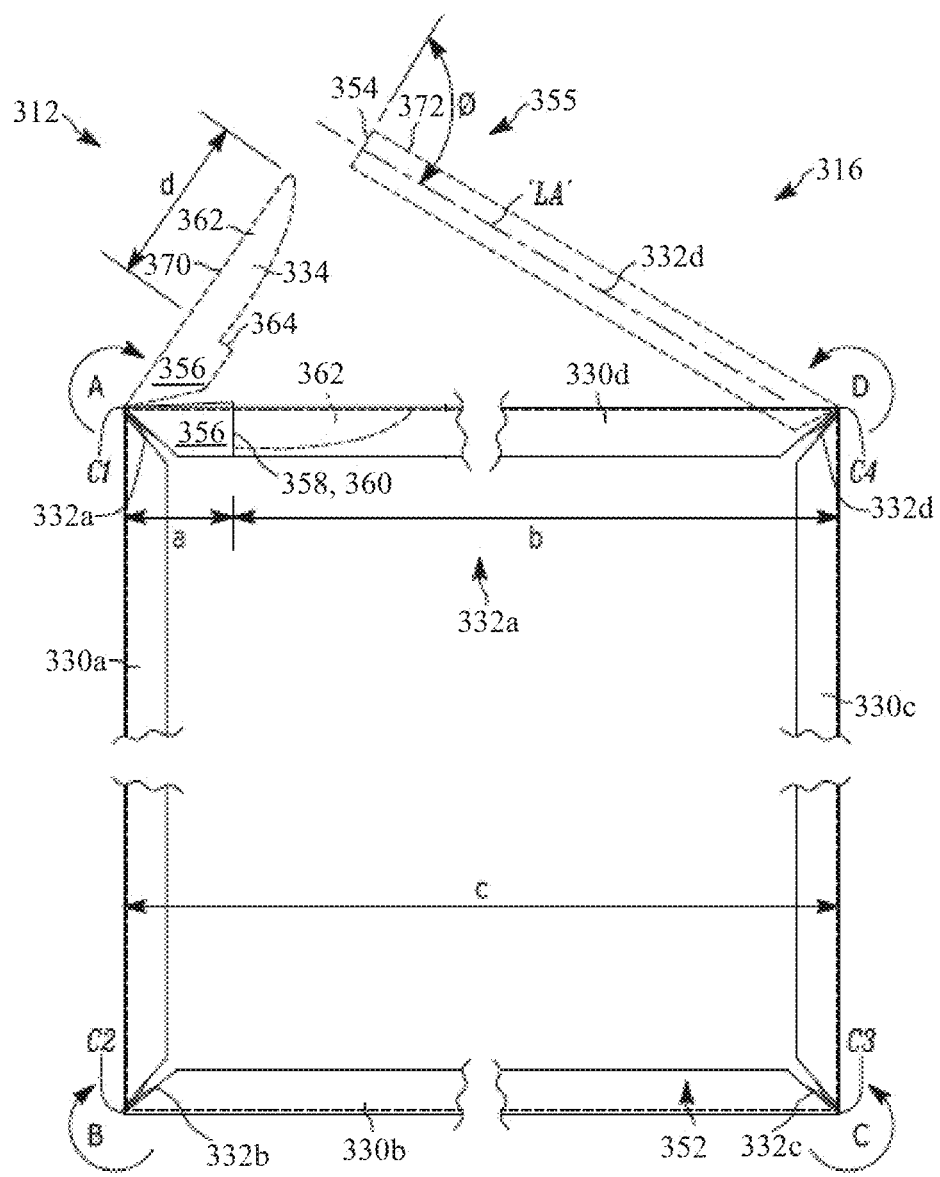
FIG. 6C is a fragmentary elevation view of a thermal space frame formed from the spacer assembly of FIG. 6A, which is illustrated in a partially constructed condition.

In a second embodiment, such as in the illustrated example embodiments of FIGS. 5A, 6A, 6B, and 6C, the connecting structure 334 comprises a stop 364 that is formed by stamping dies at a stamping station 104 as described below. The connecting structure 334 is inserted into an opposite frame end 354 or the leg member 330d when the thermal spacer frame assembly 312 has been bent to its final configuration. That is, rotating the thermal spacer frame assembly 312 members 330 (from the linear configuration of FIGS. 5A and 6A) in the direction of arrows A, B, C, and D as illustrated in FIG. 6C and particularly, inserting the frame structure end or nose 362 of the connecting structure 334 into an opposite channel 355 formed at the opposite end 354 of segment 330d with concomitant rotation of the segments (arrows A-D). This concomitant rotation continues until the connecting structure 334 slides into the opposite channel 355 of segment 330d at the opposite end 354. In the illustrated example embodiment of FIG. 6C, the opposite end 354 engages positive stops 364 in the connecting structure 334 forming a telescopic union 358 and lateral connection 360 that is spaced from the corners 332. It would be appreciated by one having ordinary skill in the art that the lateral connection 360 and/or the telescopic union 358 could be located anywhere between the first and fourth corners 332a, 332d. Further discussion as to the stop 364 and lateral connection 360 that is spaced from the corners 332 is discussed in U.S. Pat. No. 9,428,953, U.S Patent Publication No. 2015/0361713, which are incorporated herein by reference in its entirety and for all purposes.

The Production Line 100

Figure 7:
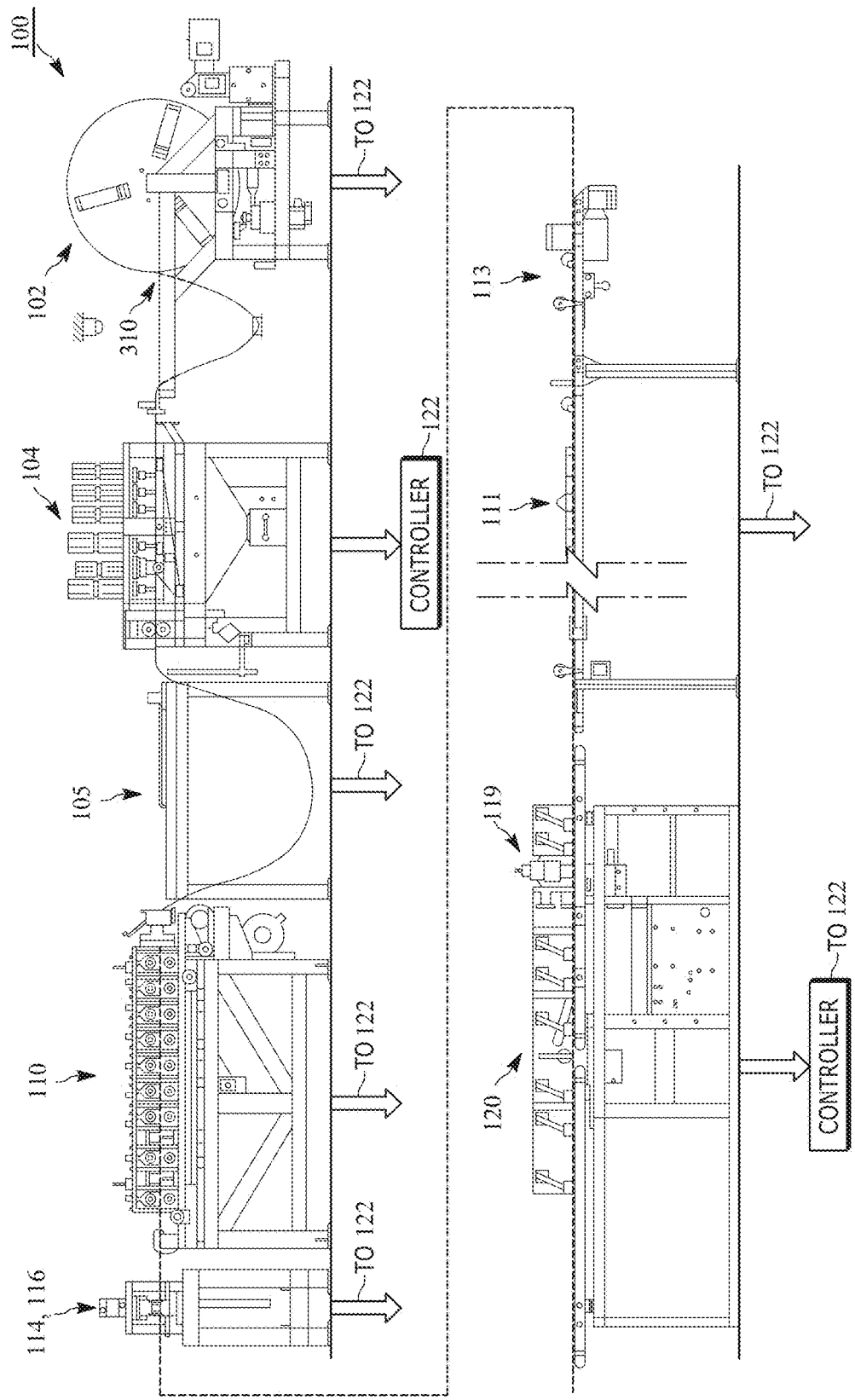
FIG. 7 is an elevation depiction of a production assembly for use in producing the thermal spacer frame assemblies of the present disclosure that are used in an IGU.

An operation by which elongated window components are made is schematically illustrated in FIG. 7 as a production line 100 through which thermal sheet stock 310 comprising the two thin, relatively narrow ribbons of sheet metal stock 306, 308 linked by the thermal interruption strip 302 and the film 304 is fed endwise from a coil into one end of the assembly line and substantially completed elongated window components 312 emerge from the other end of the line 100.

The line 100 comprises a stock supply station 102, a first forming station 104, a transfer mechanism 105, a second forming station 110, a conveyor 113, a scrap removal apparatus 111, third and fourth forming stations 114, 116, respectively. Wherein within the line 100, partially formed spacer members are separated from the leading end of the thermal sheet stock 310, the thermal sheet stock is roll formed, and frame corner locations are deformed. At a desiccant application station 119 desiccant is applied to an interior region of the spacer frame member, and at an extrusion station 120 sealant is applied to the yet to be folded frame member. A scheduler/motion controller unit 122 interacts with the stations and loop feed sensors to govern the spacer stock size, spacer assembly size, the stock feeding speeds in the line, and other parameters involved in production. A preferred controller unit 122 is commercially available from Delta Tau, 21314 Lassen St, Chatsworth, Calif. 91311 as part number UMAC. In one embodiment a separate controller 122' controls the desiccant application and adhesive or sealant application. Additional details of a representative spacer frame fabrication system are contained in US Pat. Pub. No. 2006/0075719 to James et al., which is incorporated herein by reference.

Thermal Stock 310

In one example embodiment, the spacer assembly 312 enhances the thermal properties of the resulting window by interrupting thermal energy flow of energy through an installed window. The thermal energy flow between an interior wall and an exterior wall is interrupted by the presence of the thermal interruption strip 302. For example, the thermal interruption strip 302 better maintains the temperature of the window's inwardly facing edge in winter by impeding heat flow from inside a home or other building and impeding the energy loss caused by lower temperature from the outwardly facing edge of the window.

In the illustrated example embodiment of FIG. 13, heat flow disruption is accomplished by the thermal conductivity interruption created by the thermal interruption strip 302 of the peripheral wall 340 of the frame 312. The thermal interruption strip 302 links an inner edge 303b of the first metal strip 306 and an inner edge 307b of the second metal strip 308 (see FIG. 14). The links of the inner edges 303b and 307b in the illustrated example embodiment is in an alternating sinusoidal manner increasing the strength and support between the thermal interruption strip 302 and the ribbons 306.

Figure 8:
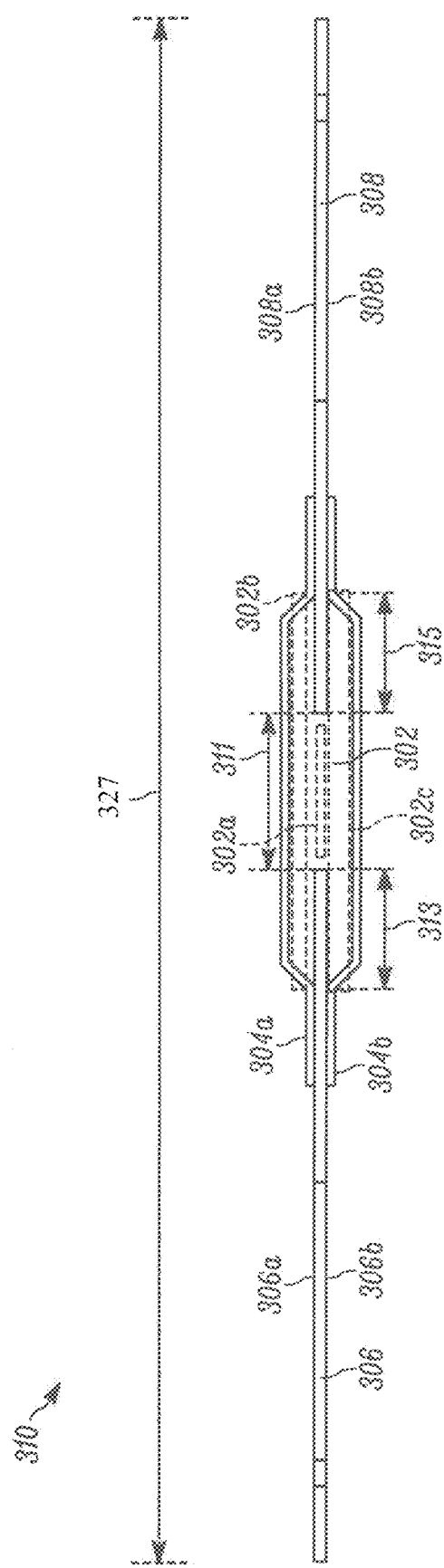
FIG. 8 is a front elevation view of thermal sheet stock constructed in accordance with one example embodiment of the present disclosure, the thermal sheet stock used to form a thermal spacer frame assembly.

The thermal interruption strip 302 comprises a polymer bridge 399. The polymer bridge 399 comprises a mechanically crimped polymer bridge with the frame member before or after roll forming, a co-extruded polymer bridge, a molded polymer bridge, or the like. In this embodiment, the thermal stock 310 is formed by an automated apparatus. In one example embodiment, such as illustrated in FIG. 8, when the thermal interruption strip 302 comprises the mechanically crimped polymer bridge, the thermal interruption strip 302 comprises a central portion 302a, an upper portion 302b, and a lower portion 302c, wherein the lower portion is positioned to interact with bottom faces 306b, 308b of the frame stock 306, 308, the central portion is positioned between the frame stock and on top of the lower portion, and the upper portion 302a is positioned on to interact with top faces 306a, 306b of the frame stock and the central portion. The upper, central, and lower portions 302a-302c are mechanically crimped together, manually or automatically, to form the thermal interruption strip 302 and to bond the thermal interruption strip to the frame stock 306, 308, to form the thermal stock 310.

In another example embodiment, when the thermal interruption strip 302 comprises the co-extruded polymer bridge, the thermal interruption strip 302 is formed as a single unit while interacting with the frame stock 306, 308. The frame stock 306, 308 is aligned relative to an extrusion apparatus, and the polymer bridge material is extruded, manually or automatically, onto the frame stock to form the thermal interruption strip 302 linking the frame stock and the thermal interruption strip 302.

Figure 10:
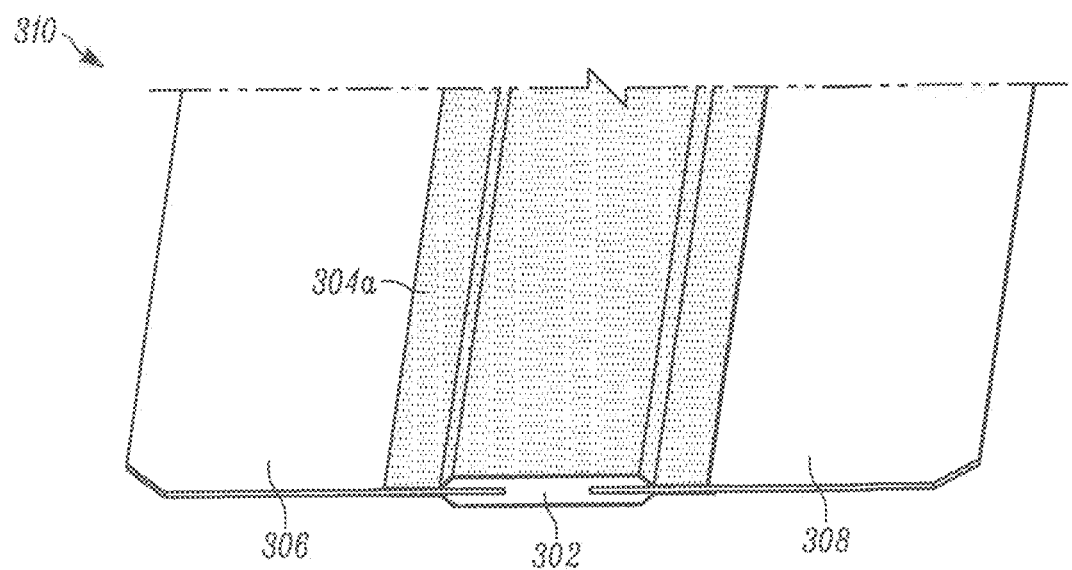
FIG. 10 is a top perspective view of thermal sheet stock.
Figure 11:
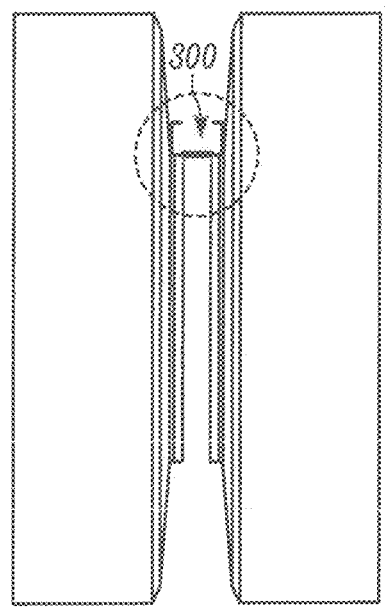
FIG. 11 is a front elevation view of thermal sheet stock being roll formed.
Figure 12:
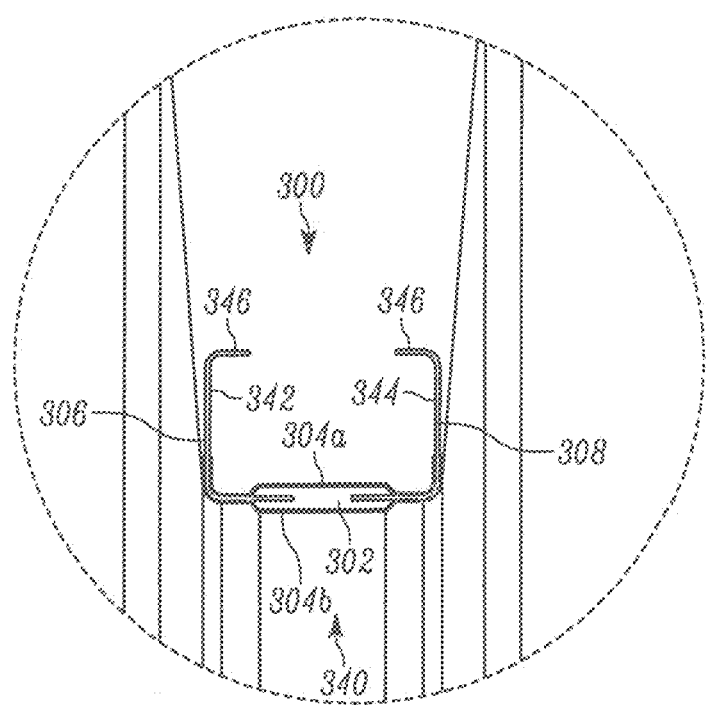
FIG. 12 is a magnified view of FIG. 11.

In the illustrated example embodiment of FIGS. 8, 9, and 10, the thermal interruption strip 302 is a polygon, and in particular, a hexagonal polygon that provides strength and support between the thermal interruption strip and ribbons 306, 308. This construction assists in providing support for high stress conditions that occurs on the strip, ribbon, and connection therebetween, especially at the corners when the spacer frame is bent for assembly. In the illustrated example embodiment, the hexagonal construction forms a hexagonal prism cross-section as seen in FIG. 10. The hexagonal prism cross-section extends longitudinally around the entire profile of the spacer frame. Laterally, the hexagonal prism cross-section includes mirrored first and second ends having upper and lower transverse ends extending to a point forming a sandwich connection with the ribbons 306, 308 starting at the first and second stability extents and extending to and beyond ends 303b and 307b (see FIGS. 8 and 10). The hexagonal prism cross-section further comprises a planar body that connects the spaced mirrored first and second ends and covers the stability extents and gap between the ends 303b and 307b as illustrated in FIGS. 8 and 10).

In yet another example embodiment, when the thermal interruption strip 302 comprises the molded polymer bridge, the thermal interruption strip 302 is formed by positioning the frame stock 306, 308 relative to a thermal interruption strip mold, and filling the mold with the thermal interruption strip material. The frame stock 306, 308 is aligned relative to the mold to obtain desired dimensions of the thermal interruption strip 302 relative to the frame stock. The polymer bridge material is injected, manually or automatically, onto the mold to form the thermal interruption strip 302 and, thus, the thermal stock 310. In yet another example embodiment, the frame stock 306, 308 is positioned after the mold has been filled, but while the thermal interruption strip material is still pliable (e.g., while a temperature of the thermal interruption strip material is over a temperature at which the material would become inflexible).

In the illustrated example embodiment of FIG. 8, the thermal interruption strip 302 extends a first stability distance 313 over a top face 306a and/or a bottom face 306b of the first frame stock portion 306 and a second stability distance 315 over a top face 308a and/or a bottom face 308b of the second frame stock portion 308 to increase a strength of the linking of the first and second frame stock portion. The thermal interruption strip 302 provides a gap distance 311 between the inner edges 303b, 307b (see FIGS. 8 and 14) of the first and second frame stock portions 306, 308. The first and second stability distances 313, 315, and the gap distance 311 are proportional to a final width 317 of the spacer frame 316 and/or a stock width 327 of the stock 310 (see FIGS. 8-9). For example, a sum of the first and second stability distances 313, 315, and the gap distance 311 is between ⅛th to about ¼th of the total stock width 327. The first and second stability distances 313, 315 are proportional to the gap distance 311 (e.g., at a ratio of between 1:2 to 1:4). In one example embodiment, the greater the gap distance 311 the greater the first and second stability distances 313, 315. In another example embodiment, the first and second stability distances 313, 315 are substantially equal to the gap distance 311. In yet another example embodiment, the sum of the first and second stability distances 313, 315, and the gap distance 311 is less than final width 317 of the spacer frame 316.

Figure 14:
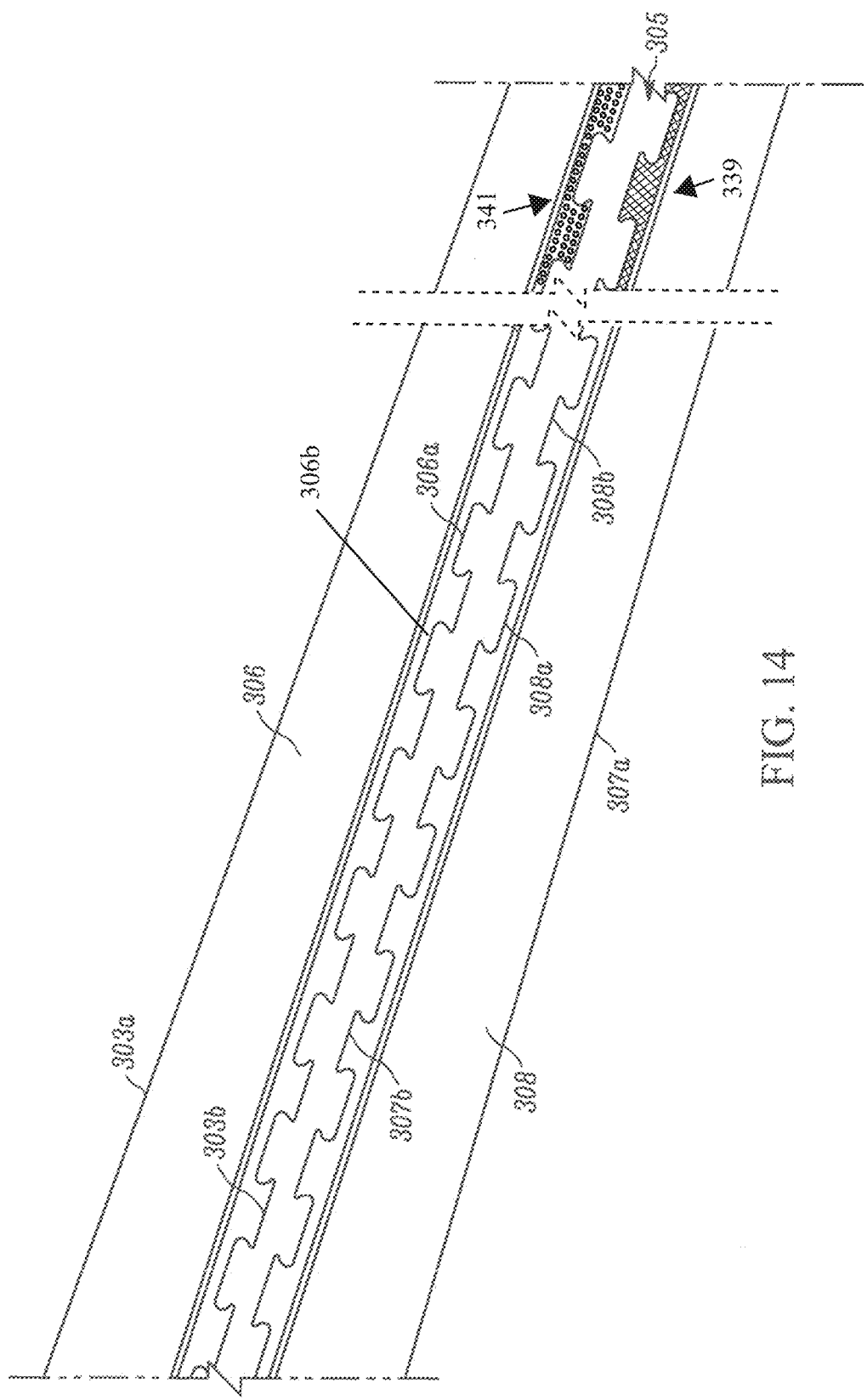
FIG. 14 is a top plan view of first and second sheet stock portions.

In another embodiment, the thermal interruption strip 302 is glued or adhered (e.g., with a pressure sensitive adhesive) to the frame stock 306, 308 (see FIGS. 8, and 14). In this embodiment, the thermal stock 310 is formed by an automated strip laminating apparatus. When the thermal interruption strip 302 is linked to the frame stock 306, 308 via adhesives or glue, the lower portion 302c is positioned to interact with bottom faces 306b, 308b of the metal strips 306, 308, the central portion 302a is positioned between the frame stock portions and on top of the lower portion, and the upper portion 302b is positioned on top faces 306, 306b of the frame stock and the central portion, wherein an adhesive or glue is disposed between the upper, central, and lower portions, and/or the frame stock. The upper, central, and lower portions 302a-302c are glued/adhered together, manually or automatically, (e.g., using pressure, such as a uniform pressure of 20-30 psi) to form the thermal interruption strip 302 and additionally, glued/adhered to the frame stock 306, 308, to form the thermal strip 310.

In yet another example embodiment, the frame stock 306, 308 (see FIG. 14) comprise serrations or shapes that add surface area to aid adherence of the thermal interruption strip 302 to along the inner edges 303b, 307b of the frame stock 306, 308. In the illustrated example embodiment of FIG. 14, the first frame stock portion 306 comprises intruding 306a and protruding 306b undulations. The second frame stock portion 308 comprises intruding 308a and protruding 308b undulations that are complementary intruding 306a and protruding 306b undulations of the first frame stock portion 306. In an additional example embodiments, the frame stock portion 306, 308 comprise interruptions (e.g., holes 341, mesh material 339, etc.) (see FIG. 14) along and adjacent to the inner edges 303b, 307b of the metal strips 306, 308 to provide added grip strength/bonding surface area to the thermal interruption strip 302. The gap distance 311 between the inner edges 303b, 307b is variable and is a factor in minimum spacer width capability. For example, a larger gap distance 311 is more thermally efficient. In one example embodiment, the thermal interruption strip 302 provides the gap distance 311 having a range between about ⅛" (inches) to about ¼" (inches). In another example embodiment, the thermal interruption strip 302 comprises a thermal interruption strip thickness 323 (see FIG. 13). The thermal interruption strip thickness 323 having a range between about ⅛" (inches) to about ¼" (inches). The thermal interruption strip 302 disrupts heat transfer across the wall from one side wall 342 to the opposed side wall 344 while maintaining a structural integrity of the wall 340.

The film 304 is applied as the thermal interruption strip 302 is being formed, before, or after the thermal interruption strip has been formed. The film 304 is applied longitudinally along the linear extent of the thermal stock 310. In one example embodiment, the film 304 is placed within the mold prior to injection of the thermal material. In this embodiment, a lower layer 304b of the film 304 (see FIG. 13) is placed in the mold and in partial contact with the first and second metal stock portions 306, 308 and an upper layer 304a of the film is placed over the thermal interruption strip 302 and over at least a portion of the first and second metal stock portions. The heat from the mold links the film 304 to the thermal interruption strip 302 and the first and second metal stock portions 306, 308. The film 304 is applied via at least one of glue or adhesive, thermal pressure, etc, and/or a combination thereof. In another example embodiment, the film 304 is applied prior to, during, or after the thermal stock 310 is roll formed into its channel shape. The film 304 is airtight and prevents fluid transfers from inside the IGU 333 to outside the IGU. Additionally, the film 304 prevents the desiccant 319 from escaping the IOU 333. In one example embodiment, the film 304 comprises a sputtered metal barrier, and is applied to the thermal stock 310 before roll forming or around the perimeter of the unit 333 after roll forming but before folding the frame 316 into a rectangle. The film 304 stretches around the corners 332 as the frame 316 is bent, adding strength and support to the ribbons 306 and 308 with the thermal interruption strip 302. An example of a suitable film 304 is 3M's 'Very Low Outgassing High Shear Polyester Tape' sold as model 8439, 'Low Outgassing Polyester Tape' sold under model number 8333, 'Very Low Outgassing Linered Polyester Tape' sold as model number 6690, and 'Aluminum Foil Tape' sold as model number 431 or 439L (Linered). The product specification sheets of these film materials are incorporated herein by reference in their entireties and for all purposes.

Figure 14A:
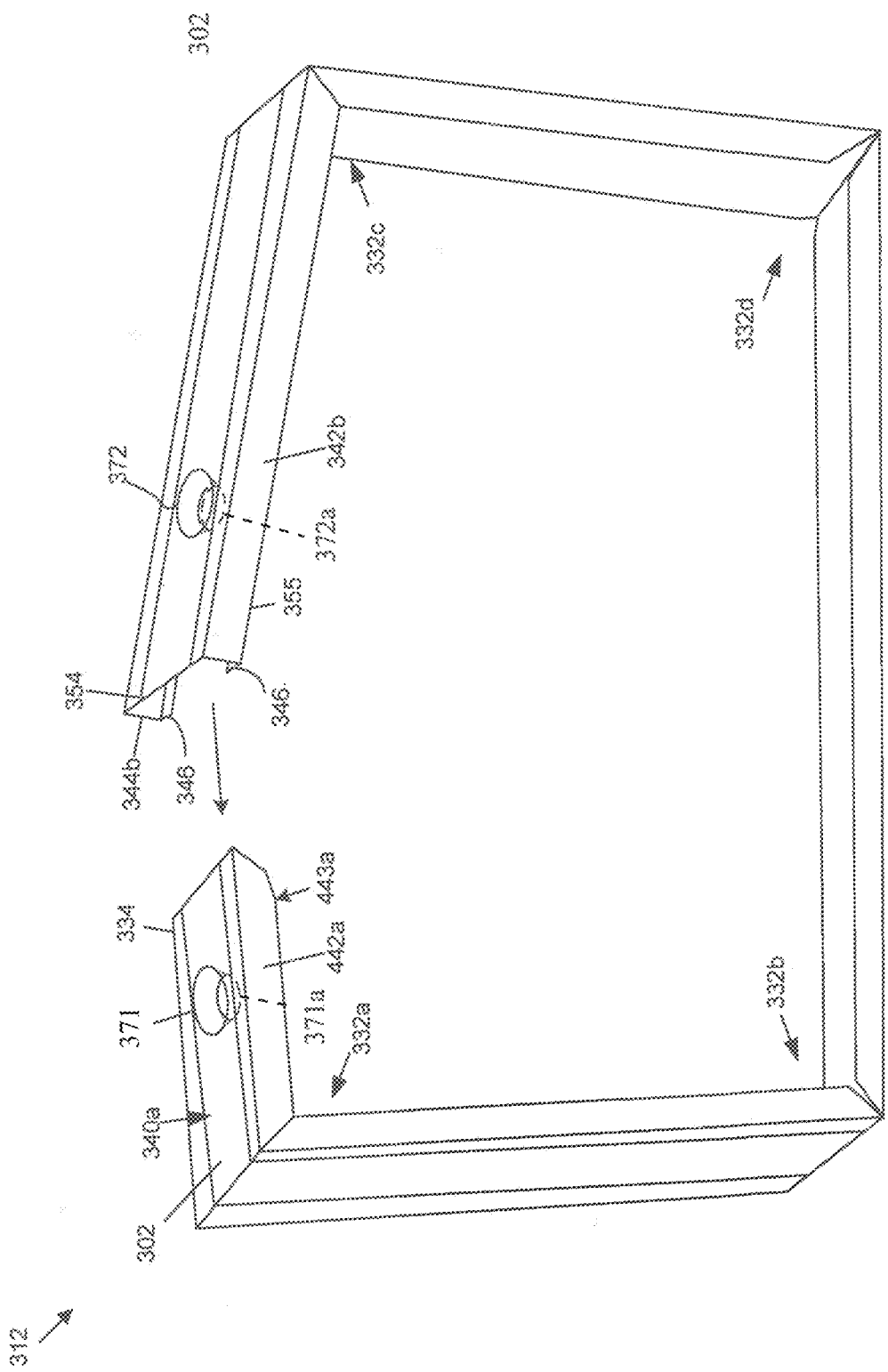
FIG. 14A is a perspective view of a thermal spacer frame assembly in accordance with one example embodiment of the present disclosure.

In another example embodiment, the thermal interruption strip 302 forms first and second projections 371a, 372a, illustrated in dashed lines in FIG. 14A. In this illustrated example embodiment, the first gas fill aperture 371 comprises the first projection 371a through the base wall 340a into the channel and the second gas fill aperture 372 comprises a second projection 372a into the channel, wherein the first projection interweaves with the second projection when assembled. The interweaving provides a friction connection. The friction connection is a responsive tactile connection, in that it provides to the assembler feedback if there is over-travel or under-travel when advancing one or both of the connecting structure 334 and the opposite channel 355 towards each other. That is, the friction during assembly remains high during under-travel until the interweaving of the projections 371a, 372 as achieved to form the fiction or responsive tactile connection. Once the interweaving is achieved, the friction significantly diminishes between the base wall 340a and the second projection 372a. Similarly, if over-travel from the tactile connection occurs, the friction significantly increases. This tactile response occurs because the second projection 372a rubs the base wall 340a of the connecting structure 334, until the tactile connection is reached between the first and second projections 371a, 372a. Further discussion as to the first and second projections, and the tactile connection is discussed in U.S. Provisional Pat. App. No. 62/402,312 and U.S. nonprovsional patent application Ser. No. 15/720,892 filed Sep. 29, 2017 which are incorporated herein by reference.

Thermal Analysis

Figure 15A:
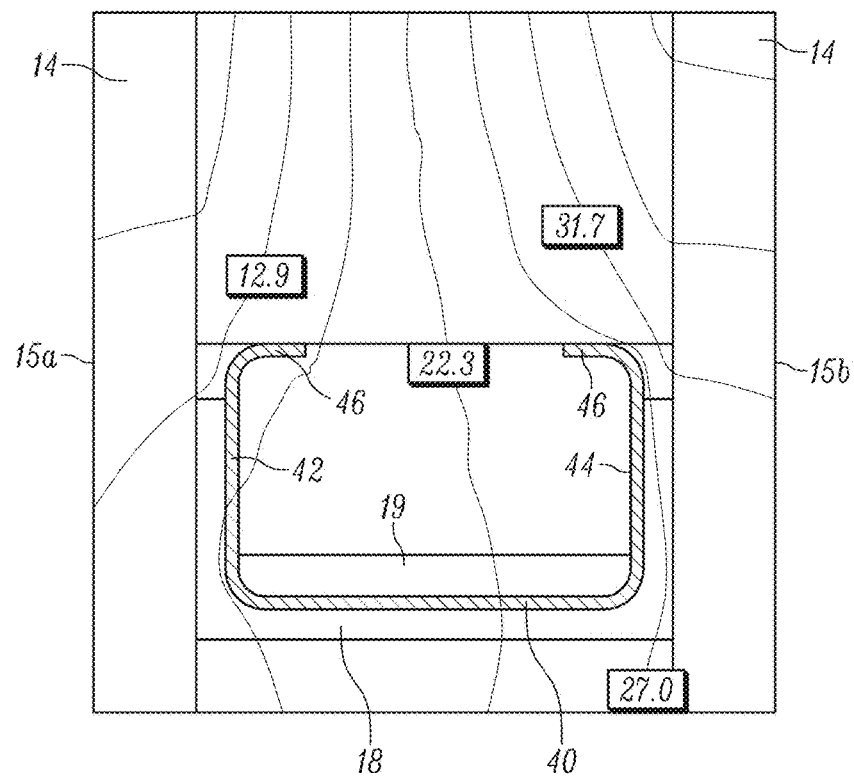
FIG. 15A is cross-section view of an isotherm of the traditional IGU of FIG. 1 taken along lines 15A-15A.
Figure 15B:
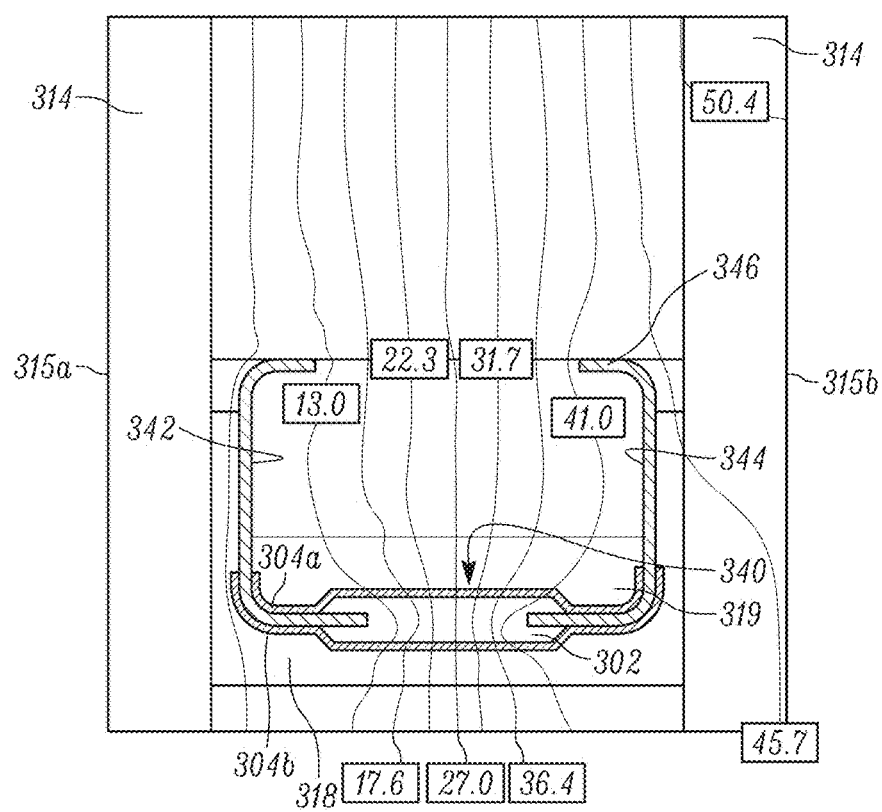
FIG. 15B is cross-section view of an isotherm of the IGU of FIG. 4 taken along lines 13-13.

Although the patterns and/or composition of the inner edges 303b, 307b of the metal stock portions 306, 308 vary, an isotherm that simulates the thermal energy transfer of this spacer system can be generated by performing a thermal analysis. FIG. 15A illustrates an isotherm of the typical IGU 10 and FIG. 15B illustrates the thermal IGU 333, both IGUs being subjected to boundary temperature of 0° F. outside 15a, 315a and 70° F. inside 15b, 315b, respectively. The lines on the isotherms are joining points representing states of equal temperature, wherein the temperature in Fahrenheit corresponds to the line as shown in a box overlaying the line.

In the illustrated example embodiment of FIG. 15B, the model illustrates where the frame stock portions 306, 308 are separated by the thermal interruption strip 302, wherein the gap distance 311 is ⅛" (inches). It would be understood by one of ordinary skill in the art that a greater gap distance 311 would cause a greater interruption in the thermal energy transfer. Comparing the traditional IGU 10, which has an inside lite 15b temperature of 34.9F, to the thermal IGU 333, which has an inside lite 315a temperature of 48.3F, illustrates that less thermal energy is lost when the thermal IGU 333 is being utilized.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus, the following claims are hereby incorporated into the Detailed Description, with each claim standing on its own as a separately claimed subject matter.

What is claimed is:

1. A multi-sided channel shaped composite spacer frame for arranging first and second glass lites in a spaced apart, generally parallel relation to each other, said spacer frame comprising:
   an elongated thermal interruption strip comprising at least a portion of a peripheral wall, the elongated thermal interruption strip forms a portion of said composite spacer frame and extends around a periphery of the spacer frame;
   a first elongated frame stock comprising at least a portion of the peripheral wall and comprising a first lateral wall, wherein an edge portion of the first elongated frame stock is secured to the thermal interruption strip;
   a second elongated frame stock comprising at least a portion of the peripheral wall and comprising a second lateral wall, wherein an edge portion of the second elongated frame stock is secured to the thermal interruption strip, the first and second lateral walls and the peripheral wall forming an u-shaped channel defining an interior region; and
   a vapor barrier overlying the thermal interruption strip and at least a portion of the peripheral wall to impede contaminants from reaching the interior region bounded by the first and second elongated frame stocks and prevent loss of fluids from the interior region, the vapor barrier comprising an airtight film.

2. The spacer frame of claim 1 wherein the vapor barrier comprises a first film overlying at least a portion of the first and second first lateral walls, the peripheral wall and a first side of the thermal interruption strip, the first side inside the u-shaped channel and a second film overlying at least a portion of a second side of the thermal interruption strip, the second side outside the u-shaped channel.

3. The spacer frame of claim 1 additionally comprising an adhesive that bonds the first and second elongated frame stocks to the thermal interruption strip.

4. The spacer frame of claim 1 wherein the first and second elongated frame stocks comprise a bend between the edge portions and the lateral walls of the frame stocks.

5. The spacer frame of claim 1 wherein the thermal interruption strip comprises a non-thermally conductive material that has a lower thermal conductivity than the first and second elongated frame stocks.

6. The spacer frame of claim 5 wherein the thermal interruption strip comprises three portions wherein a middle portion of the three portions couples and spaces two outer portions of the three portions, the two outer portions are adhesively bonded to the edge portions of the first and second elongated frame stocks, respectively.

7. The spacer frame of claim 1 wherein the first and second elongated frame stocks comprise a metal material and wherein the elongated thermal interruption strip comprises a polymer.

8. The spacer frame of claim 1 wherein the edge portions of one of the first and second elongated frame stocks comprise intruding and protruding undulations.

9. The spacer frame of claim 8 wherein the edge portions of both the first and second elongated frame stocks comprise intruding and protruding undulations.

10. The spacer frame of claim 1 wherein the edge portions of the first and second elongated frame stocks comprise interruptions to increase a bonding surface between the frame stocks and the thermal interruption strip.

11. A multi-sided channel shaped composite spacer frame for arranging first and second glass lites in a spaced apart, generally parallel relation to each other, said spacer frame comprising:
an elongated thermal interruption strip comprising at least a portion of a peripheral wall, the elongated thermal interruption strip forms a portion of said composite spacer frame and extends around a periphery of the spacer frame, the elongated thermal interruption strip extending around and defining at least three corners that connect at least four sides of a spacer frame;
a first elongated frame stock comprising at least a portion of the peripheral wall and comprising a first lateral wall, wherein a first edge portion of the first elongated frame stock is secured to the thermal interruption strip, the first elongated frame stock extending around and defining the at least three corners that connect the at least four sides of the spacer frame; and
a second elongated frame stock comprising at least a portion of the peripheral wall and comprising a second lateral wall, and wherein a second edge portion of the second elongated frame stock is secured to the thermal interruption strip, the second elongated frame stock extending around and defining the at least three corners that connect the at least four sides of the spacer frame, wherein the peripheral wall couples the first lateral wall to the second lateral wall forming a u-shaped channel.

12. The spacer from of claim 11, comprising a vapor barrier comprising an airtight film overlying at least a portion of the thermal interruption strip in an interior region to impede contaminants from reaching the interior region bounded by the first and second lateral walls and the peripheral wall and prevent loss of fluids from the interior region.

13. The spacer from of claim 11, comprising a vapor barrier overlying at least a portion of the peripheral wall and overlaying the thermal interruption strip to impede contaminants from reaching an interior region bounded by the first and second elongated frame stocks and thermal interruption strip to prevent loss of fluids from the interior region.

14. The spacer from of claim 11, comprising a vapor barrier, the vapor barrier comprising a first and second film, the first film overlying at least a portion of the peripheral wall and overlaying the thermal interruption strip and the second film overlying an interior region including at least a portion of the peripheral wall and overlaying the thermal interruption strip, the first film opposite the second film across the thermal interruption strip and the first and second elongated frame stocks.

15. The spacer frame of claim 11 wherein the thermal interruption strip comprises a non-thermally conductive material that has a lower thermal conductivity than the first and second elongated frame stocks, further wherein the non-thermally conductive material is adhesively bonded to the edge portions of said first and second frame stocks.

16. The spacer from of claim 11, comprising a vapor barrier, the vapor barrier comprising an airtight film, the airtight film overlying at least a portion of the first lateral wall, the peripheral wall, and at least a portion of the second lateral wall.

17. The spacer from of claim 11, wherein the thermal interruption strip comprises a polygonal shape, wherein at least a portion of the first and second elongated frame stocks are sandwiched between first and second portions of the polygonal shape.

18. The spacer frame of claim 11 wherein the first and second elongated frame stocks comprise a metal material and wherein the elongated thermal interruption strip comprises a polymer, wherein the edge portions of one of the first and second elongated frame stocks comprise intruding and protruding undulations.

19. The spacer frame of claim 11 wherein the first and second elongated frame stocks comprise a metal material and wherein the elongated thermal interruption strip comprises a polymer wherein the edge portions of the first and second elongated frame stocks comprise interruptions to increase a bonding surface between the frame stocks and the thermal interruption strip.

20. A multi-sided channel shaped composite spacer frame for arranging first and second glass lites in a spaced apart, generally parallel relation to each other, said spacer frame comprising:
an elongated thermal interruption strip comprising at least a portion of a peripheral wall of the spacer frame, the thermal interruption strip comprises a non-thermally conductive polymer that has a first thermal conductivity, the thermal interruption strip forms a portion of said composite spacer frame and extends around a periphery of the spacer frame, the thermal interruption strip comprising a durometer between 70 to 90 Shore D;
a first elongated frame stock comprising a first lateral wall and at least a portion of the peripheral wall wherein a first edge portion of the first elongated frame stock is secured to the thermal interruption strip, the first elongated wall member comprising a first bend spaced from the first edge portion, the first bend transitioning the first elongated frame stock from the peripheral wall to the first lateral wall;
a second elongated frame stock comprising a second lateral wall and at least a portion of the peripheral wall, wherein a second edge portion of the second elongated frame stock is secured to the thermal interruption strip, the second elongated frame stock comprises a second bend spaced from the second edge portion, the second bend transitioning the second elongated frame stock from the peripheral wall to the second lateral wall, the first and second elongated frame stocks having a second thermal conductivity, the second thermal conductivity greater than the first thermal conductivity; and
a vapor barrier comprising an airtight film, the airtight film overlying at least a portion of the first lateral wall, the peripheral wall, and at least a portion of the second lateral wall.

* * * * *